United States Patent [19]

Takahashi et al.

[11] Patent Number: 5,214,074
[45] Date of Patent: May 25, 1993

[54] FOAMABLE SILICONE RUBBER COMPOSITION AND SILICONE RUBBER SPONGE

[75] Inventors: Masaharu Takahashi; Jun Hatakeyama; Terukazu Satoh, all of Annaka, Japan

[73] Assignee: Shin-Etsu Chemical Co., Ltd., Tokyo, Japan

[21] Appl. No.: 826,540

[22] Filed: Jan. 27, 1992

[30] Foreign Application Priority Data

Jan. 29, 1991 [JP] Japan .................. 3-27853

[51] Int. Cl.⁵ .............................. C08J 9/10
[52] U.S. Cl. ...................... 521/88; 521/94; 521/154
[58] Field of Search ............. 521/154, 88, 94

[56] References Cited

U.S. PATENT DOCUMENTS

| | | | |
|---|---|---|---|
| 3,425,967 | 2/1969 | Modic | 521/154 |
| 3,923,705 | 12/1975 | Smith | 521/154 |
| 4,024,091 | 5/1977 | Lee et al. | 521/154 |
| 4,026,843 | 5/1977 | Kittle | 521/154 |
| 4,490,488 | 12/1984 | Cush | 521/154 |
| 4,608,395 | 8/1986 | Hamada et al. | |
| 4,704,408 | 11/1987 | Krug et al. | 521/154 |
| 4,705,810 | 11/1987 | Millet et al. | 521/154 |
| 4,980,384 | 12/1990 | Takahashi et al. | |

FOREIGN PATENT DOCUMENTS

| | | |
|---|---|---|
| 2030653 | 1/1971 | Fed. Rep. of Germany . |
| 47-43294 | 11/1972 | Japan . |
| 53-14592 | 5/1978 | Japan . |
| 61-223034 | 10/1986 | Japan . |
| 63-10180 | 3/1988 | Japan . |
| 2-175735 | 7/1990 | Japan . |
| 1137420 | 12/1968 | United Kingdom . |
| 2137630 | 10/1984 | United Kingdom . |

OTHER PUBLICATIONS

World Patents Index Latest Section Ch, Week 8620, Jul. 9, 1986, Derwent Publications Ltd., London, GB; Class A, AN 86-127657 & JP-A-61 064 656.
Shinetsu Polymer Co. Ltd.) Apr. 1986 Abstract.

*Primary Examiner*—Morton Foelak
*Attorney, Agent, or Firm*—Birch, Stewart, Kolasch & Birch

[57] ABSTRACT

A foamable silicone rubber composition comprising (A) a diorganopolysiloxane having a viscosity of at least $10^6$ cs at 25° C., (B) an organohydrogenpolysiloxane, (C) a platinum catalyst, (D) azodicarbonamide foaming agent, and (E) an acetylenic alcohol reaction controlling agent is foamed and cured, preferably through UHF vulcanization, into silicone rubber sponge. The sponge having satisfactory strength and foam properties is obtained without a hygienic problem.

12 Claims, No Drawings

FOAMABLE SILICONE RUBBER COMPOSITION AND SILICONE RUBBER SPONGE

This invention relates to a foamable silicone rubber composition which is foamed and cured into safe and hygienic silicone rubber sponge.

BACKGROUND OF THE INVENTION

Silicone rubber sponges are generally manufactured by adding a crosslinking agent, foaming agent or the like to a silicone rubber compound, milling the mixture, and then extruding the mixture through an extruder whereupon it is foamed and cured in a continuous line by way of atmospheric hot air vulcanization (HAV) or other conventional processes. Commonly used cross-linking agents include acyl peroxides such as benzoyl peroxide, 2,4-dichlorobenzoyl peroxide, p-chlorobenzoyl peroxide, and p-methylbenzoyl peroxide, alone or combined with other peroxides such as dicumyl peroxide, 2,5-dimethylbis(2,5-tert-butyl peroxy)hexane, di-tert-butyl peroxide, and tert-butyl perbenzoate. Included in the foaming agents are azobisisobutyronitrile, dinitropentamethylenetetramine, p,p'-oxybis(benzenesulfonyl hydrazide), N,N'-dinitroso-N,N'-dimethylterephthalamide, and azodicarbonamide.

Some foaming agents like azobisisobutyronitrile and dinitropentamethylenetetramine leave decomposition residues which are detrimental to the human body from a safe and hygienic aspect. Also, acyl peroxide cross-linking agents such as benzoyl peroxide, 2,4-dichlorobenzoyl peroxide, p-methylbenzoyl peroxide leave decomposition residues which are more or less detrimental to the human body. Formation of such decomposition residues is undesirable for the maintenance of a working environment, and removal of decomposition residues requires a long term of heating. In addition, sponges accompanied by a hygienic problem due to the use of these foaming and crosslinking agents are not recommended for utility in food and cosmetic fields.

In contrast, azodicarbonamide and p,p'-oxybis(benzenesulfonyl hydrazide) are known as foaming agents having minimal influence on the human body. It is also known that hygienically most preferred sponges are formed by cross-linking through platinum-catalyzed addition reaction between alkenyl and SiH groups. It is thus desired to produce silicone rubber sponges by using these foaming agents and the addition curing reaction route.

Preparation of silicone rubber sponges by way of addition reaction is disclosed in Japanese Patent Publication (JP-B) No. 43294/1972 whereas it is not indicated to use azodicarbonamide and p,p'-oxybis(benzenesulfonyl hydrazide) as foaming agents. JP-B 1459/1978 discloses a process for foaming and curing a silicone compound while partially effecting addition reaction, but it is not indicated to use azodicarbonamide and p,p'-oxybis(benzenesulfonyl hydrazide) as foaming agents. The latter process requires an extra step of aging for allowing addition reaction to take place partially.

Japanese Patent Application Kokai (JP-A) No. 223034/1986 discloses a polydiorganosiloxane based sponge which is prepared from a composition comprising a vinyl-containing polydimethylsiloxane, a liquid foaming agent which is gaseous at 25° C. under atmospheric pressure, and a platinum or rhodium catalyst. The polydimethylsiloxane composition is cured through catalytic hydrosilation and foamed at the same time. Undesirably, the liquid foaming agent is difficult to handle and expensive.

JP-B 10180/1988 discloses a foamable silicone rubber composition comprising a polydiorganosiloxane having a viscosity of up to 100,000 centistokes, a polyorganohydrogensiloxane, and p,p'-oxybis(benzenesulfonyl hydrozide) as a foaming agent. A platinum catalyst catalyzes addition reaction between an alkenyl group of the polydiorganosiloxane and a SiH group of the polyorganohydrogensiloxane. This curing, coupled with concurrent foaming, results in a sponge. It is described that if azodicarbonamide and similar foaming agents are used instead, sponges are formed, but without curing, and the sponges lack strength. Curing does not take place probably because premature decomposition of the foaming agent occurs before the onset of addition curing reaction.

As mentioned above, an acceptable foamable silicone rubber composition of the addition reaction curing type using an azodicarbonamide foaming agent is not available up to the present.

SUMMARY OF THE INVENTION

Therefore, a primary object of the present invention is to provide a foamable silicone rubber composition using an azodicarbonamide foaming agent which remains safe and hygienic during manufacture. Another object of the present invention is to provide a foamable silicone rubber composition from which silicone rubber sponges having acceptable strength and porosity are obtained. A further object of the invention is to provide a silicone rubber sponge obtained by curing such a composition.

According to the present invention, there is provided a foamable silicone rubber composition comprising (A) a diorganopolysiloxane of average compositional formula (1):

$$R_nSiO_{(4-n)/2} \quad (1)$$

wherein R is a substituted or unsubstituted monovalent hydrocarbon group, 0.01 to 20 mol % of the R group being an alkenyl group, and letter n is a positive number of from 1.98 to 2.02, having a viscosity of at least $10^6$ centistokes (cs) at 25° C., (B) an organohydrogenpolysiloxane,
(C) a platinum catalyst,
(D) azodicarbonamide as a foaming agent, and
(E) an addition reaction control agent.

On curing the composition, the addition reaction control agent such as an acetylenic alcohol is effective for controlling the rate of addition curing reaction so as to match with the rate of decomposition of the foaming agent, making it possible to cure and foam a high viscosity polymer in the form of diorganopolysiloxane having a viscosity of at least $10^6$ cs into a silicone rubber sponge. Silicone rubber sponges having improved strength and cell structure can be produced without aging as required in the system of JP-B 1459/1978 using azodicarbonamide.

The foamable silicone rubber composition can be foamed or expanded by various techniques as will be described later. The inventors have found that microwave (UHF) irradiation vulcanization is most effective for vulcanizing the composition into silicone rubber sponges. As to UHF vulcanization, it is known from JP-B 175735/1990 to add a ferrite compound to a foamable silicone rubber composition. The inventors have found that azodicarbonamide itself well absorbs UHF radiation. Then it serves not only as a foaming agent during foam molding, but also for absorbing UHF radiation to heat up, thus increasing molding efficiency. Therefore, silicone rubber sponges of quality can be produced through UHF vulcanization without the use of UHF absorbers such as ferrite.

DETAILED DESCRIPTION OF THE INVENTION

According to the present invention, the foamable silicone rubber composition is defined as comprising (A) a diorganopolysiloxane of formula (1), (B) an organohydrogenpolysiloxane, (C) a platinum catalyst, (D) azodicarbonamide, and (E) an addition reaction control agent for controlling the rate of addition curing reaction.

Component (A) is a diorganopolysiloxane of average compositional formula (1).

$$R_n SiO_{(4-n)/2} \tag{1}$$

In formula (1), R is a substituted or unsubstituted monovalent hydrocarbon group having 1 to 10 carbon atoms, preferably 1 to 8 carbon atoms, for example, alkyl groups such as methyl, ethyl and propyl groups, aryl groups such as phenyl group, alkenyl groups such as vinyl and allyl groups, and substituted ones of these groups in which some hydrogen atoms are replaced by halogen atoms, cyano group or the like, about 0.01 to about 20 mol %, preferably about 0.01 to about 5 mol % of the $R^1$ group being an alkenyl group. Letter n is a positive number of from 1.98 to 2.02. The molecular chain of the diorganopolysiloxane as component (A) may be terminated with a trimethylsiloxy, dimethylphenylsiloxy, dimethylvinylsilyl, methyldivinylsilyl, and trivinylsilyl group, for example.

The diorganopolysiloxane should have a viscosity of at least about $10^6$ cs at 25° C., preferably from about $10^6$ to about $10^8$ cs at 25° C. With a viscosity of less than $10^6$ cs, the entire foamable silicone rubber composition becomes less viscous so that when foamed and cured, evolving gases will escape, failing to form uniform pores. No practically acceptable sponges are obtained. The diorganopolysiloxanes as component (A) may be used alone while a mixture of two or more diorganopolysiloxanes having different viscosities or molecular structures is acceptable.

Often, the diorganopolysiloxanes are prepared by (co)hydrolytic condensation of one or more select organohalosilanes or by ring-opening polymerization of a cyclic polysiloxane (a siloxane trimer or tetramer) in the presence of an alkali or acid catalyst.

Component (B) is an organohydrogenpolysiloxane which is generally an organopolysiloxane having a hydrogen atom directly attached to a silicon atom. The molecular configuration may be linear, branched, or cyclic. Exemplary are a diorganopolysiloxane endblocked with a dimethylhydrogensilyl group, a copolymer comprising dimethylsiloxane, methylhydrogensiloxane, and terminal trimethylsiloxane units, a low viscosity fluid comprising dimethylhydrogensiloxane and $SiO_2$ units, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane.

Component (B) is preferably blended such that there are available about 0.5 to 3 mol, especially about 0.7 to 1.7 mol of SiH bond per mol of the alkenyl group of organopolysiloxane (A).

Component (C) is a platinum catalyst for catalyzing addition reaction between the alkenyl group of diorganopolysiloxane (A) and the SiH group of organohydrogenpolysiloxane (B) thereby curing the silicone rubber compound. The platinum catalyst may be selected from those well known as addition reaction catalysts, for example, elemental platinum, platinum compounds, and platinum complexes. Exemplary are chloroplatinic acid (chloroplatinic acid and chloroplatinous acid), and complexes of chloroplatinic acid with alcohols, aldehydes, ethers, and olefins.

The platinum catalyst may be used in a catalytic amount, generally in an amount of about 0.1 to 1000 ppm, preferably about 1 to 200 ppm of metallic platinum based on the weight of component (A). Less than 0.1 ppm of Pt will fail to catalyze the addition reaction to a sufficient extent for the resulting sponge to exert rubbery physical properties. Since the platinum catalyst is expensive, it should be added in a permissible minimum amount because otherwise, the silicone rubber composition becomes uneconomical.

Component (D) is an azodicarbonamide foaming agent for causing the silicone rubber compound to foam. It is stable at room temperature, but when heated to temperatures of 100° C. or higher, decomposes to evolve foaming gases composed mainly of nitrogen gas, carbon dioxide gas, and carbon monoxide gas. The azodicarbonamide foaming agent is commercially available as CELMICE® CE, C-22, and CAP-250 from Sankyo Chemicals K.K. an Vinihole AC from Eiwa Chemicals K.K.

Foaming agent (D) is preferably blended in an amount of about 1 to 10 parts, more preferably 2 to 7 parts by weight per 100 parts by weight of organopolysiloxane (A). Less than 1 part by weight of the foaming agent would evolve an insufficient amount of foaming gases to produce well foamed sponge whereas more than 10 parts by weight of the foaming agent would adversely affect the workability of the composition and the distribution of pores and sometimes induce cracks within the sponge which fails to maintain the desired shape.

The azodicarbonamide foaming agent may have added thereto various foaming aids such as inorganic salts, metal soaps, acids, urea, ethanol amine, and glycols.

Component (E) is an addition reaction control agent for controlling the rate of addition curing reaction, more particularly for providing a matching between the rate of addition curing reaction and the rate of foaming.

The control agents include vinyl group-containing low-molecular siloxanes having a molecular weight of 50 to 1,000, preferably 90 to 600, acetylenic alcohols, acetylene glycol compounds, and organosilanes and organosiloxanes having a molecular weight of 50 to 1,000, preferably 70 to 600 and modified with acetylenic alcohols or acetylene glycol compounds.

Examples of the vinyl group-containing low-molecular siloxanes include tetramethyldivinylsiloxane, dimethyltetravinyldisiloxane, hexavinyldisiloxane, trimethyltrivinylcyclotrisiloxane, tetramethyltetravinylcyclotetrasiloxane and the like.

The acetylenic alcohols may have the following formula:

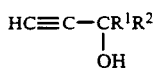

wherein $R^1$ and $R^2$ are independently selected from monovalent hydrocarbon groups having 1 to 10 carbon atoms including alkyl groups, cycloalkyl groups such as cyclohexyl group and cyclopentyl group and aryl groups.

Examples of the acetylenic alcohols include 3-methyl-1-pentyn-3-ol, 3-phenyl-1-butyn-3-ol, 3-methyl-1-butyn-3-ol, 1-ethynylcyclohexane-1-ol and 1-ethnyl-cyclododecan-1-ol.

The acetylene glycol compounds may have the following formula:

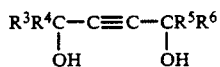

wherein $R^3$, $R^4$, $R^5$ and $R^6$ are independently selected from monovalent hydrocarbon groups having 1 to 10 carbon atoms including alkyl groups, cycloalkyl groups and aryl groups.

Example of the acetylene glycol compounds is shown below.

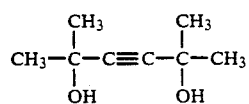

Examples of the modified organosilanes and organosiloxanes with acetylenic alcohols or acetylene glycol compounds are shown below.

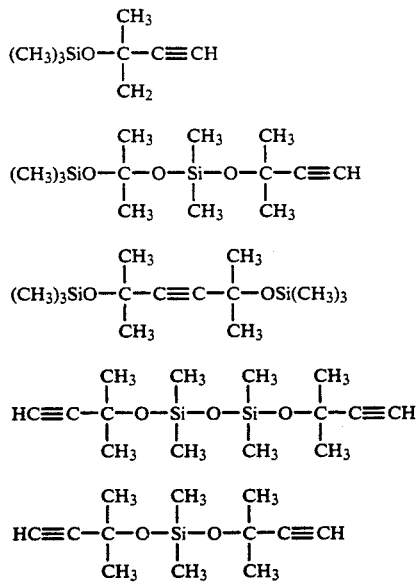

The amount of the control agent added varies as the nature (hardness, specific gravity, and texture) of the molded sponge varies with such factors as platinum amount, the type of foaming agent, polymer crosslinking density, and the type of additives. In general, the control agent is used in such amounts that the addition curing reaction proceeds substantially at the same rate as the decomposition rate of the foaming agent used.

Preferably the control agents is used in an amount of about 0.001 to 0.05 parts, more preferably about 0.003 to 0.03 parts by weight per 100 parts by weight of component (A). Less than 0.001 part of control agent would not retard the curing rate, allowing the silicone rubber composition to have cured before the onset of foaming. More than 0.05 parts would slow down the curing reaction such that foaming might come to completion before curing, resulting in under-vulcanized sponges which lack elasticity.

Further, a finely divided silica filler is preferably blended as a sixth component (F) in the foamable silicone rubber composition of the invention. The silica filler is added for the purpose of reinforcement, viscosity build-up, processability improvement, and extension of the silicone rubber. Fumed silica and precipitated silica are useful. For imparting mechanical strength to the silicone rubber, these fillers preferably have a specific surface area of at least about 100 m$^2$/g, preferably about 100 to 400 m$^2$/g as measured by the BET method. The silica filler preferably has a mean particle size of about 5 m$\mu$ to 10 $\mu$m, especially about 5 m$\mu$ to 1 $\mu$m. Filler (F) is preferably blended in an amount of about 10 to 70 parts, more preferably about 30 to 50 parts by weight per 100 parts by weight of organopolysiloxane (A). Adequate reinforcement would not be achieved outside the range.

In addition to components (A) to (F), the foamable silicone rubber composition of the present invention may contain any desired additives insofar as the benefits of the invention are not lost. For imparting flame retardancy, carbon, iron oxide, aluminum hydroxide, benzotriazole and the like may be added. For regulating the hardness of silicone sponge, ground quartz, fused quartz, magnesium carbonate, magnesium sulfate, and calcium carbonate may be added. Also useful are conventional rubber additives which are commonly used in conventional silicone rubber compositions. Exemplary additives include diatomaceous earth, iron oxide, zinc oxide, titanium oxide, ferrite, carbon black, barium oxide, magnesium oxide, cerium hydroxide, calcium carbonate, magnesium carbonate, zinc carbonate, asbestos, glass wool, finely divided mica, and fused silica powder. If desired, there may be added pigments, dyes, anti-oxidants, anti-aging agents, anti-static agents, flame retardants (e.g., antimony oxide and chlorinated paraffin), and heat transfer modifiers (e.g., boron nitride and aluminum oxide). Dispersants for assisting the dispersion of fillers may also be blended. Known filler dispersants are diphenylsilane diol, various alkoxysilanes, carbon functional silanes, and silanol-containing low molecular weight siloxanes.

The silicone rubber composition may be obtained by uniformly mixing the above-mentioned components in a conventional rubber masticating machine such as twin roll mill, Banbury mixer, and dough mixer or kneader and optional heat treatment. The order of mixing the components is not critical. One effective sequence of mixing is by first masticating components (A) and (F) uniformly and successively mixing components (C), (E), (D), and (B) in this order. The resulting silicone rubber composition may be molded into a silicone rubber sponge form in a conventional manner by conventional molding methods including casting, pressure molding in molds, extrusion molding, and coating to various substrates. Most often, extrusion molding is employed. Then the composition is expanded by any of conventional foaming methods including atmospheric hot air vulcanization (HAV), steam continuous vulcanization (CV), molten salt vulcanization (LCM), and microwave irradiation vulcanization (UHF vulcanization). Most often, UHF vulcanization is employed. The UHF vulcanization is the most effective procedure which can be combined with continuous extrusion for the consistent, cost-effective manufacture of thick sponges for use as building gaskets, insulators, and sponge rolls. In producing silicone sponges by UHF vulcanization, the composition is exposed to microwave having a frequency of 2450±50 MHz or 915±25 MHz to internally induce heat for effecting vulcanization.

Foaming and curing may be conducted at about 100° to about 400° C., preferably about 150° to 300° C. for about 1 to about 20 minutes, although the temperature and time is selected depending on the shape and property of the product to be prepared.

After the foaming and curing step, if desired, the silicone sponge is post cured at about 150° to 200° C. for 0 to 8 hours, completing vulcanization and decomposition of the foaming agent.

EXAMPLE

Examples of the invention are given below by way of illustration and not by way of limitation. All parts are by weight. Viscosity is measured at 25° C.

EXAMPLE 1

A base compound A was prepared by adding 40 parts of fumed silica (trade name Aerogel 200, Nippon Aerogel K.K.) and 3 parts of diphenylsilane diol and 4 parts of silanol-terminated dimethylpolysiloxane (degree of polymerization 10) as dispersants to 100 parts of gum-like organopolysiloxane consisting of 99.825 mol % of dimethylsiloxy unit, 0.15 mol % of methylvinylsiloxy unit, and 0.025 mol % of dimethylvinylsiloxy unit and having a viscosity of $1 \times 10^7$ cs. The ingredients were kneaded for 2 hours in a dough mixer while heating at 170° C.

EXAMPLE 2

A base compound B was prepared by adding 40 parts of wet silica (trade name Nipsil Lp, Nippon Silica K.K.) and 3 parts of dimethoxydimethylsilane and 1 part of silanol-terminated dimethylpolysiloxane (degree of polymerization 10) as dispersants to 100 parts of gum-like organopolysiloxane consisting of 99.825 mol % of dimethylsiloxy unit, 0.15 mol % of methylvinylsiloxy unit, and 0.025 mol % of dimethylvinylsiloxy unit and having a viscosity of $1 \times 10^7$ cs. The ingredients were kneaded for 2 hours in a dough mixer while heating at 170° C.

A foamable silicone rubber composition was prepared by adding 1.0 part of organohydrogenpolysiloxane (SiH group/vinyl group molar ratio=1.3) and 100 ppm of platinum to 100 parts of the base compound A or B, further adding thereto 1-ethynylcyclohexan-1-ol and azodicarbonamide foaming agent (trade name CELMICE CAP-250, Sankyo Chemicals K.K.) in the amounts shown in Table 1, and thoroughly milling the mixture in a twin roll mill. The composition was sheeted into a piece of 70 mm long by 50 mm wide by 5 mm thick, which was placed in hot air stream at 250° C. for 10 minutes. The physical properties of the resulting sponge are shown in Table 1.

For comparison purposes, a composition was prepared from base compound A in the same manner as above except that 1-ethynylcyclohexan-1-ol was omitted. The results are also shown in Table 1.

TABLE 1

|  | Example 1 | Example 2 | Comparative Example 1 |
| --- | --- | --- | --- |
| Composition (pbw) |  |  |  |
| Base compound | A 100 | B 100 | A 100 |
| 1-ethynylcyclohexan-1-ol | 0.006 | 0.012 | 0 |
| CELMICE CAP - 250 Sponge | 2.0 | 2.0 | 2.0 |
| Hardness, Ascar C | 20 | 15 | under-vulcanized |
| Foaming factor, % | 320 | 420 | 103 cracked |

EXAMPLES 3 AND 4

The foamable silicone rubber composition of Example 2 was fed to an extruder with a cylinder having a diameter of 40 mm/10 mm and a length to diameter ratio (L/D) of 12, equipped with a die having a diameter 20 mm/19 mm, from which it was continuously extruded at a rate of 1 m/sec. into a silicone rubber rod having an outer diameter of 5 mm at room temperature (15° to 30° C.). In Example 3, the silicone rubber rod was foamed and cured into a sponge by passing it through a 12-m long tubular heating oven at a speed of 1 m/min. through which hot air was circulated at 200° C. UHF radiation at a power of 2 kW and a frequency of 2,450 MHz was additionally irradiated in Example 4. The time taken until foaming was measured. After the primary curing mentioned above, secondary curing was effected by placing the samples for 4 hours in a hot air dryer at 200° C. for completing crosslinking and allowing low molecular weight decomposition products to volatilize off.

TABLE 2

|  | Example 3 | Example 4 |
| --- | --- | --- |
| Composition (pbw) |  |  |
| Base compound | 100 | 100 |
| 1-ethynylcyclohexan-1-ol | 0.012 | 0.012 |
| CELMICE CAP - 250 | 2.0 | 2.0 |
| Foaming and curing | hot air | hot air and UHF |
| Foaming time, min. | 10 | 13 |
| Sponge hardness, Ascar C | 23 | 18 |
| Foaming factor, % | 300 | 400 |

COMPARATIVE EXAMPLE 2

A base compound C was prepared by the same procedure as base compound A except that a gum-like organopolysiloxane having a viscosity of 2,000 cs was used.

A silicone rubber composition was prepared by adding the same crosslinking and foaming agents in the same proportions as in Example 1 to base compound C. The composition was sheeted into a piece of 70 mm long by 50 mm wide by 5 mm thick, which was placed in hot air stream at 250° C. for 250 minutes. Evolving gases escaped during the process. The resulting sponge was not acceptable for practical purposes since the cells are not uniform and the surface texture was rugged.

There has been described a foamable silicone rubber composition which is free of a safety and hygienic problem during manufacture and working and which can be foamed and cured into silicone rubber sponge having satisfactory strength and foam properties.

EXAMPLES 5 AND 6

A foamable silicone rubber composition was prepared by adding 1.0 part of organohydrogenpolysiloxane (SiH group/vinyl group molar ratio=1.3) and 100 ppm of platinum to 100 parts of the total of the base compounds A and B, further adding thereto the control agent shown in Table 3 and azodicarbonamide forming agent (trade name CELMICE CAP-250, Sankyo Chemicals K.K.) in the amounts shown in Table 3, and thoroughly milling the mixture in a twin roll mill. The composition was sheeted into a piece of 70 mm long by 50 mm wide by 5 mm thick, which was placed in hot air stream at 250° C. for 10 minutes. The physical properties of the resulting sponge are shown in Table 3.

TABLE 3

|  | Example 5 | Example 6 |
| --- | --- | --- |
| Composition (pbw) |  |  |
| Base compound A | 50 | 50 |
| Base compound B | 50 | 50 |
| Tetramethyltetravinyl-cyclotetrasiloxane | 0.006 | 0 |
| 1-ethynylcyclohexane-1-ol | 0.012 | 0.024 |
| CELMICE CAP - 250 | 2 | 2 |
| Sponge |  |  |
| Hardness, Ascar C | 22 | 27 |
| Foaming factor, % | 350 | 300 |

EXAMPLES 7 AND 8

A foamable silicone rubber composition was prepared by adding 1.0 part of organohydrogenpolysiloxane (SiH group/vinyl group molar ratio=1.3) and 100 ppm of platinum to 100 parts of the base compound A, further adding thereto the control agent shown in Table 4 and azodicarbonamide foaming agent (trade name CELMICE CAP-250, Sankyo Chemical K.K.) in the amounts shown in Table 4, and thoroughly milling the mixture in a twin roll mill. The composition was sheeted into a piece of 70 mm long by 50 mm wide by 5 mm thick, which was placed in hot air stream at 250° C. for 10 minutes. The physical properties of the resulting sponge are shown in Table 4.

TABLE 4

|  | Example 7 | Example 8 |
| --- | --- | --- |
| Composition (pbw) |  |  |
| Base compound A | 100 | 100 |
| Control agent 1 | 0.010 | — |
| Control agent 2 | — | 0.015 |
| CELMICE CAP - 250 | 2.0 | 2.0 |
| Sponge |  |  |
| Hardness, Ascar C | 18 | 15 |
| Foaming factor, % | 360 | 430 |

Control agent 1:

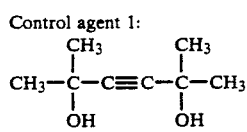

Control agent 2:

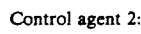

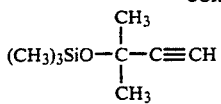

Several preferred embodiments have been described. Obviously many modifications and variations of the present invention are possible in the light of the above teachings. It is therefore to be understood that within the scope of the appended claims, the invention may be practiced otherwise than as specifically described.

We claim:

1. A foamable silicone rubber composition comprising
(A) a diorganopolysiloxane of average compositional formula (1):

$$R_nSiO_{(4-n)/2} \tag{1}$$

wherein R is a substituted or unsubstituted monovalent hydrocarbon group, about 0.01 to about 20 mol % of the R group being an alkenyl group, and letter n is a positive number of from 1.98 to 2.02, having a viscosity of at least $10^6$ centistokes (cs) at 25° C.,
(B) an organohydrogenpolysiloxane,
(C) a platinum catalyst,
(D) azodicarbonamide, and
(E) an addition reaction control agent for controlling the rate of addition curing reaction, selected from the group consisting of vinyl group-containing siloxanes having a molecular weight of 50 to 1,000, acetylenic alcohols, acetylene glycol compounds, and organosilanes and organosiloxanes having a molecular weight of 50 to 1,000 and modified with acetylenic alcohols or acetylene glycol compounds;
wherein component (E) is blended in an amount of about 0.001 to 0.05 parts by weight per 100 parts by weight of component (A), so that the addition curing reaction proceeds substantially at the same rate as the decomposition rate of the foaming agent.

2. The composition of claim 1 wherein component (B) is blended such that there are available about 0.5 to 3 mol of SiH bond per mol of the alkenyl group of organopolysiloxane (A).

3. The composition of claim 1 wherein component (D) is blended in an amount of about 1 to 10 parts by weight per 100 parts by weight of organopolysiloxane (A).

4. The composition of claim 1 which further comprises a finely divided silica filler having a specific surface area of at least about 100 m²/g in an amount of about 10 to 70 parts by weight per 100 parts by weight of organopolysiloxane (A).

5. A silicone sponge obtained by causing a foamable silicone rubber composition as set forth in claim 1 to foam and cure.

6. The composition of claim 1, wherein said addition reaction control agent of component (E) is selected from the group consisting of tetramethyldivinylsiloxane, dimethyltetravinyldisiloxane, hexavinyldisiloxane, trimethyltrivinylcyclotrisiloxane, tetramethyltetravinylcyclotetrasiloxane, 3-methyl-1-pentyl-3-ol, 3-phenyl-1-butyn-3-ol, 3-methyl-1-butyn-3-ol, 1-ethynylcyclohexane-1-ol, and 1-ethnylcyclododecan-1-ol.

7. The composition of claim 1, wherein said addition reaction control agent of component (E) is selected from the group consisting of:

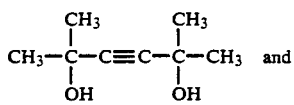

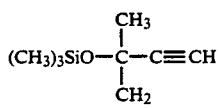

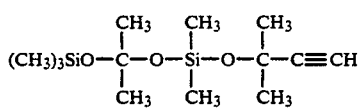

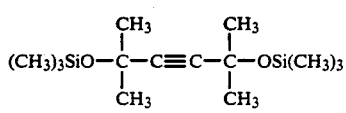

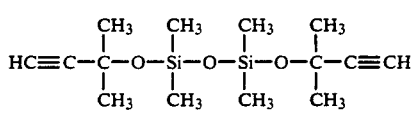

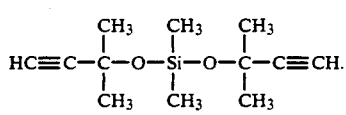

8. The composition according to claim 1, wherein component (E) is blended in an amount of about 0.003 to 0.03 parts by weight per 100 parts by weight of component (A).

9. A foamable silicone rubber composition comprising (A) a diorganopolysiloxane of average compositional formula (1):

$$R_nSiO_{(4-n)/2} \quad (1)$$

wherein R is a substituted or unsubstituted monovalent hydrocarbon group, about 0.01 to about 20 mol % of the R group being an alkenyl group, and letter n is a positive number of from 1.98 to 2.02, having a viscosity of at least $10^6$ centistokes (cs) at 25° C., (B) an organohydrogenpolysiloxane,
(C) a platinum catalyst,
(D) azodicarbonamide, and
(E) an addition reaction control agent for controlling the rate of addition curing reaction, said component (B) being blended such that there are available about 0.5 to 3 mol of SiH bond per mol of the alkenyl group of organopolysiloxane (A), said component (C) being blended in an amount of about 0.1 to 1,000 ppm of metallic platinum based on the weight of component (A), said component (D) being blended in an amount of about 1 to 10 parts by weight per 100 parts by weight of organopolysiloxane (A), and said component (E) being selected from the group consisting of a vinyl group-containing siloxanes having a molecular weight of 50 to 1,000, acetylenic alcohols, acetylene glycol compounds, and organosilanes and organosiloxanes having a molecular weight of 50 to 1,000 and modified with acetylenic alcohols or acetylene glycol compounds and blended in an amount of about 0.001 to 0.05 parts by weight per 100 parts by weight of component (A) so that the addition curing reaction proceeds substantially at the same rate as the decomposition rate of the foaming agent.

10. The composition according to claim 9, wherein said addition reaction control agent of component (E) is selected from the group consisting of 1-ethynylcyclohexan-1-ol, tetramethyltetravinylcyclotetrasiloxane,

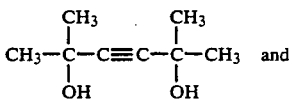

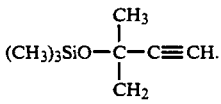

11. The composition according to claim 9, wherein component (E) is blended in an amount of about 0.003 to 0.03 parts by weight per 100 parts by weight of component (A).

12. The composition according to claim 10, wherein component (E) is blended in an amount of about 0.003 to 0.03 parts by weight per 100 parts by weight of component (A).

* * * * *